United States Patent
Bales et al.

(10) Patent No.: US 12,164,987 B2
(45) Date of Patent: Dec. 10, 2024

(54) SYSTEM AND METHOD OF CONTROLLING UNIQUE IDENTITIES OF AMBIENT ELECTROMAGNETIC POWER HARVESTING CHIPS

(71) Applicant: T-Mobile Innovations LLC, Overland Park, KS (US)

(72) Inventors: Mark R. Bales, Lee's Summit, MO (US); Lyle T. Bertz, Lee's Summit, MO (US); Lyle W. Paczkowski, Mission Hills, KS (US); Harry W. Perlow, Palm Harbor, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/332,284

(22) Filed: Jun. 9, 2023

(65) Prior Publication Data
US 2024/0020502 A1    Jan. 18, 2024

Related U.S. Application Data

(63) Continuation of application No. 17/867,218, filed on Jul. 18, 2022, now Pat. No. 11,714,985.

(51) Int. Cl.
*G06K 19/07* (2006.01)
(52) U.S. Cl.
CPC .............................. *G06K 19/0708* (2013.01)
(58) Field of Classification Search
CPC ............ G06K 19/0708; G06Q 10/0833; G06F 21/6218; G06F 21/64
See application file for complete search history.

(56) References Cited

U.S. PATENT DOCUMENTS

| | | |
|---|---|---|
| 6,882,128 B1 | 4/2005 | Rahmel et al. |
| 7,986,935 B1 | 7/2011 | D'Souza et al. |
| (Continued) | | |

FOREIGN PATENT DOCUMENTS

| | | |
|---|---|---|
| EP | 4172863 A1 | 5/2023 |
| EP | 4205031 A1 | 7/2023 |
| (Continued) | | |

OTHER PUBLICATIONS

Office Action dated Apr. 30, 2020, U.S. Appl. No. 16/158,299, filed Oct. 12, 2018.

(Continued)

*Primary Examiner* — Seung H Lee

(57) ABSTRACT

A system for controlling assignment and management of identities in ambient electromagnetic power harvesting (AEPH) chips. The system comprises a processor; a non-transitory memory; and an application stored in the non-transitory memory that, when executed by the processor, allocates a plurality of unique AEPH identities, wherein each unique identity comprises an identity of a product item and an instance identity; stores the plurality of unique AEPH identities in a first immutable record in a datastore, wherein the unique AEPH identities are associated with an initial state; provides the plurality of unique AEPH identities to an original equipment manufacturer of AEPH chips; provides an application programming interface (API); authorizes a request to update a state associated with a first unique AEPH identity in the datastore; and adds a second immutable record to the database that associates the first unique AEPH identity with an updated state of the first unique AEPH identity.

20 Claims, 7 Drawing Sheets

(56) References Cited

U.S. PATENT DOCUMENTS

| | | |
|---|---|---|
| 8,204,794 B1 | 6/2012 | Peng et al. |
| 8,593,256 B2 | 11/2013 | Isabell |
| 9,411,992 B1 | 8/2016 | Marek et al. |
| 9,894,471 B1 | 2/2018 | Zalewski et al. |
| 10,938,449 B1 | 3/2021 | Loman et al. |
| 11,238,324 B1 | 2/2022 | Marquardt et al. |
| 11,258,302 B1 | 2/2022 | Marquardt et al. |
| 11,704,528 B2 | 7/2023 | Marquardt et al. |
| 11,714,985 B1 | 8/2023 | Bales et al. |
| 11,757,305 B2 | 9/2023 | Marquardt et al. |
| 11,900,198 B2 | 2/2024 | Marquardt et al. |
| 11,924,908 B1 | 3/2024 | Paczkowski et al. |
| 12,073,417 B2 | 8/2024 | Chen |
| 2004/0155778 A1 | 8/2004 | Shek et al. |
| 2006/0071925 A1 | 4/2006 | Wykoff et al. |
| 2006/0134580 A1 | 6/2006 | Raby et al. |
| 2007/0205902 A1 | 9/2007 | Cote et al. |
| 2008/0018467 A1 | 1/2008 | Estevez et al. |
| 2008/0126111 A1 | 5/2008 | Loda |
| 2008/0129457 A1 | 6/2008 | Ritter et al. |
| 2009/0096574 A1 | 4/2009 | Oberle |
| 2009/0315686 A1 | 12/2009 | Oberle |
| 2010/0090004 A1 | 4/2010 | Sands et al. |
| 2010/0102123 A1 | 4/2010 | Skowronek |
| 2011/0181399 A1 | 7/2011 | Pollack et al. |
| 2012/0018505 A1 | 1/2012 | Jiang et al. |
| 2013/0084796 A1 | 4/2013 | Kerr |
| 2013/0320079 A1 | 12/2013 | Nordin et al. |
| 2014/0134468 A1 | 5/2014 | Schaefer et al. |
| 2015/0048682 A1 | 2/2015 | Murley |
| 2015/0069126 A1 | 3/2015 | Leon |
| 2017/0270323 A1 | 9/2017 | Butler et al. |
| 2019/0034672 A1 | 1/2019 | Rokhsaz |
| 2019/0138870 A1 | 5/2019 | Kuzbari et al. |
| 2019/0149725 A1 | 5/2019 | Adato et al. |
| 2019/0347454 A1 | 11/2019 | Mongrenier et al. |
| 2019/0354824 A1 | 11/2019 | Mohiuddin et al. |
| 2020/0004999 A1 | 1/2020 | Kawaguchi et al. |
| 2020/0180935 A1 | 6/2020 | Zumtobel et al. |
| 2020/0219112 A1 | 7/2020 | Nakayma et al. |
| 2020/0227813 A1 | 7/2020 | Yehezkely |
| 2020/0265446 A1 | 8/2020 | Vargas |
| 2021/0019482 A1 | 1/2021 | Shakedd et al. |
| 2021/0019585 A1 | 1/2021 | Shakedd et al. |
| 2021/0219102 A1 | 7/2021 | Gion et al. |
| 2021/0224727 A1 | 7/2021 | Rakhunde et al. |
| 2021/0280307 A1 | 9/2021 | Hargrove et al. |
| 2021/0342559 A1 | 11/2021 | Frederick |
| 2022/0109667 A1 | 4/2022 | Gorog |
| 2022/0121894 A1 | 4/2022 | Marquardt et al. |
| 2022/0180141 A1 | 6/2022 | Marquardt et al. |
| 2022/0331841 A1 | 10/2022 | Filler et al. |
| 2022/0344971 A1 | 10/2022 | Marquardt et al. |
| 2022/0374030 A1 | 11/2022 | Lehtonen et al. |
| 2023/0187811 A1 | 6/2023 | Cohen et al. |
| 2023/0306224 A1 | 9/2023 | Marquardt et al. |
| 2023/0351406 A1 | 11/2023 | Marquardt et al. |
| 2023/0359982 A1 | 11/2023 | Mohseni |
| 2024/0047994 A1 | 2/2024 | Paczkowski et al. |
| 2024/0127022 A1 | 4/2024 | Marquardt et al. |

FOREIGN PATENT DOCUMENTS

| | | |
|---|---|---|
| EP | 4278425 A1 | 11/2023 |
| WO | 2008051598 A1 | 5/2008 |
| WO | 2008055212 A2 | 5/2008 |
| WO | 2015187199 A1 | 12/2015 |
| WO | 2018063449 A1 | 4/2018 |
| WO | 2018132120 A1 | 7/2018 |
| WO | 20200208412 A1 | 10/2020 |
| WO | 2022060475 A1 | 3/2022 |
| WO | 2022125162 A1 | 6/2022 |
| WO | 2022231682 A1 | 11/2022 |
| WO | 20240167584 A1 | 8/2024 |

OTHER PUBLICATIONS

Notice of Allowance dated Oct. 30, 2020, U.S. Appl. No. 16/158,299, filed Oct. 12, 2018.
Notice of Allowance dated Oct. 5, 2021, U.S. Appl. No. 17/024,484, filed Sep. 17, 2020.
Notice of Allowance dated Oct. 21, 2021, U.S. Appl. No. 17/240,846, filed Apr. 26, 2021.
Notice of Allowance dated Mar. 7, 2023, U.S. Appl. No. 17/568,019, filed Jan. 4, 2022.
Notice of Allowance dated May 3, 2023, U.S. Appl. No. 17/867,218, filed Jul. 18, 2022.
Office Action dated May 11, 2023, U.S. Appl. No. 17/161,415, filed Jan. 28, 2021.
Office Action dated Jun. 20, 2023, U.S. Appl. No. 17/115,596, filed Dec. 8, 2020.
Notice of Allowance dated May 11, 2023, U.S. Appl. No. 17/571,294, filed Jan. 7, 2022.
Foreign Communication From a Related Counterpart Application, International Search Report and Written Opinion dated Nov. 23, 2021, International Application No. PCT/US2021/044086 filed on Jul. 31, 2021.
Foreign Communication From a Related Counterpart Application, International Search Report and Written Opinion dated Dec. 6, 2021, International Application No. PCT/US2021/051159 filed on Sep. 20, 2021.
Foreign Communication From a Related Counterpart Application, Invitiation to Pay Additional Fees dated May 30, 2022, International Application No. PCT/US2022/017304.
Foreign Communication From a Related Counterpart Application, International Search Report and Written Opinion dated Jul. 21, 2022, International Application No. PCT/US2022/017304.
Foreign Communication From a Related Counterpart Application, International Search Report and Written Opinion dated May 3, 2023, International Application No. PCT/US2023/014517.
Loman, Clinton H., et al., "Battery Coupled Radio Frequency Identity (RFID)," filed Jan. 28, 2021, U.S. Appl. No. 17/161,415.
Marquardt, Ronald, R., et al., "Multi-tier Identities in an RFID Chip," filed Dec. 8, 2020, U.S. Appl. No. 17/115,596.
Marquardt, Ronald, R., et al., "RFID Device with Two-Stage Power Harvesting," filed Jul. 31, 2021, International Application No. PCT/US2021/044086.
Marquardt, Ronald, R., et al., "Multi-tier Identities in an RFID Chip," filed Sep. 20, 2021, International Application No. PCT/US2021/051159.
Marquardt, Ronald, R., et al., "Ambient Electromagnetic Power Harvesting Chip Adaptation Based on Available Power Level," filed Jan. 7, 2022, U.S. Appl. No. 17/571,294.
Marquardt, Ronald, R., et al., "Ambient Electromagnetic Power Harvesting Chip Adaptation Based on Available Power Level," filed Feb. 22, 2022, International Application No. PCT/US2022/017304.
Bales, Mark, R., et al., "System and Method of Controlling Unique Identities of Ambient Electromagnetic Power Harvesting Chips," filed Jul. 18, 2022, U.S. Appl. No. 17/867,218.
Bales, Mark, R., et al., "System and Method of Controlling Lifecycles of Ambient Electromagnetic Power Harvesting Chips," filed Feb. 7, 2023, U.S. Appl. No. 18/165,877.
Bales, Mark, R., et al., "System and Method of Controlling Unique Identities of Ambient Electromagnetic Power Harvesting Chips," filed Jun. 1, 2023, International Application No. PCT/US2023/067789.
Balmakhtar, Marouane, et al., "Differentiated and Modulated Spectrum Power Radiation Via MIMO and Beamforming Imposed Upon Ambient Electromagnetic Power Harvesting Chips," filed Apr. 3, 2023, U.S. Appl. No. 18/295,075.
Chen, Zhisheng, "Anti-counterfeiting System for Bottled Products," filed May 2, 2022, U.S. Appl. No. 17/734,555.
Chen, Zhisheng, "Anti-counterfeiting System for Bottled Products," filed Mar. 3, 2023, International Application No. PCT/US2023/014517.
Balmakhtar, Marouane, et al., "Device and Method for Controlling a Physical Indicator of an Ambient Electromagnetic Power Harvesting Device," filed Apr. 10, 2023, U.S. Appl. No. 18/298,253.

(56) References Cited

OTHER PUBLICATIONS

Office Action dated Oct. 17, 2023, U.S. Appl. No. 17/165,877, filed Feb. 7, 2023.
Marquardt, Ronald, R., et al., "Multi-tier Identities in an RFID Chip," filed Dec. 20, 2023, U.S. Appl. No. 18/325,936.
Final Office Action dated Apr. 1, 2024, U.S. Appl. No. 17/161,415, filed Jan. 28, 2021.
Office Action dated Apr. 8, 2024, U.S. Appl. No. 17/165,877, filed Feb. 7, 2023.
Tahir, M., et al. "An Approach for Managing Manufacturing Assets through Radio Frequency Energy Harvesting". Future and Automation Systems and Technologies Laboratory, Jan. 2019.
Notice of Allowance dated Apr. 19, 2024, U.S. Appl. No. 17/734,555, filed May 2, 2022.
Office Action dated Sep. 14, 2023, U.S. Appl. No. 17/161,415, filed Jan. 28, 2021.
Notice of Allowance dated Sep. 27, 2023, U.S. Appl. No. 17/115,596, filed Dec. 8, 2020.
Foreign Communication From a Related Counterpart Application, International Search Report and Written Opinion dated Sep. 26, 2023, International Application No. PCT/US2023/067789.
Marquardt, Ronald, R., et al., "RFID Device with Two-Stage Power Harvesting," filed May 24, 2023, U.S. Appl. No. 18/323,268.
"Bales, Mark, R., et al., ""Ambient Electromagnetic Power Harvesting Device for Collecting and Forwarding Data,"" filed May 30, 2023, U.S. Appl. No. 18/325,936."
Office Action dated Jan. 8, 2024, U.S. Appl. No. 17/734,555, filed May 2, 2022.
Notice of Allowance and Fee(s) dated Jul. 18, 2024, U.S. Appl. No. 17/161,415, filed Jan. 28, 2021.
Chen, Zhisheng, "Anti-counterfeiting System for Bottled Products," filed Jul. 12, 2024, U.S. Appl. No. 18/772,096.

SYSTEM AND METHOD OF CONTROLLING UNIQUE IDENTITIES OF AMBIENT ELECTROMAGNETIC POWER HARVESTING CHIPS

CROSS-REFERENCE TO RELATED APPLICATIONS

This application is a continuation of and claims priority under 35 U.S.C. § 120 to U.S. patent application Ser. No. 17/867,218 filed on Jul. 18, 2022, entitled "System and Method of Controlling Unique Identities of Ambient Electromagnetic Power Harvesting Chips," by Mark R. Bales, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) chips conventionally are divided into passive RFIDs and active RFIDs. Active RFIDs have their own autonomous power supply, such as a battery. Passive RFIDs harvest electric power from ambient electromagnetic waves, for example electromagnetic waves emitted by a proximate reader or scanner device. The typical passive RFID has limited capabilities and stores 2 MB or less of data. RFIDs can be manufactured inexpensively and are small enough to be affixed to and concealed within products such as clothing or sporting goods to support inventory tracking and product identification. Typically, an RFID stores identifying information assigned by an original equipment manufacturer (OEM) of the RFID. The identity may identify a product SKU and not be unique from one RFID to another RFID.

SUMMARY

In an embodiment, a method of controlling assignment and management of identities in ambient electromagnetic power harvesting (AEPH) chips is disclosed. The method comprises allocating a plurality of unique AEPH identities by an AEPH management application executing on a computer system, wherein each unique AEPH identity comprises an identity of a product item and an instance identity; storing the plurality of unique AEPH identities by the AEPH management application in a first immutable record in a datastore, wherein the first immutable record associates each unique AEPH identity with an initial state; and providing the plurality of unique AEPH identities by the AEPH management application to an original equipment manufacturer (OEM) of AEPH chips, wherein the OEM uses the plurality of unique AEPH identities to embed a one of the unique AEPH identities in each of a plurality of AEPH chips when manufacturing the AEPH chips. In an embodiment, the method further comprises providing an application programming interface (API) by the AEPH management application to authenticated AEPH identity management partners; receiving a first request via the API by the AEPH management application to update a state associated in the datastore with a first unique AEPH identity to a first state, wherein the first unique AEPH identity is one of the plurality of unique AEPH identities stored in the first immutable record in the datastore; analyzing a history of states associated in the datastore with the first unique AEPH identity by the AEPH management application to determine that the first state is a valid state change based on the history of states associated in the datastore with the first unique AEPH identity; authorizing by the AEPH management application the first request to update the state associated in the datastore with the first unique AEPH identity; and, in response to the successful authorization of the first request, adding a second immutable record to the datastore by the AEPH management application wherein the second immutable record in the datastore associates the first unique AEPH identity with a second state identified in the first request. In an embodiment, the method further comprises receiving a second request via the API by the AEPH management application to update a state associated with a second unique AEPH identity to a second state, wherein the second unique AEPH identity is one of the plurality of unique AEPH identities stored in the first immutable record in the datastore; analyzing a history of states associated in the datastore with the second unique AEPH identity by the AEPH management application to determine that the second state is an invalid state change based on the history of states associated in the datastore with the second unique AEPH identity; and rejecting by the AEPH management application the second request to update the state associated in the datastore with the second unique AEPH identity identified in the second request, whereby the state associated in the datastore with the second unique AEPH identity remains unchanged.

In another embodiment, a system for controlling assignment and management of identities in ambient electromagnetic power harvesting (AEPH) chips is disclosed. The method comprises a processor, a non-transitory memory; and an AEPH management application stored in the non-transitory memory. When executed by the processor, the AEPH management application allocates a plurality of unique AEPH identities, wherein each unique identity comprises an identity of a product item and an instance identity; stores the plurality of unique AEPH identities in a first immutable record in a datastore, wherein the unique AEPH identities are associated with an initial state; and provides the plurality of unique AEPH identities to an original equipment manufacturer (OEM) of AEPH chips. The AEPH management application further provides an application programming interface (API); receives a request via the API to update a state associated in the datastore with a first unique AEPH identity identified in the request; authorizes the request to update the state associated with the first unique AEPH identity in the datastore; and adds a second immutable record to the database that associates the first unique AEPH identity with an updated state of the first unique AEPH identity.

In yet another embodiment, a method of controlling assignment and management of identities in ambient electromagnetic power harvesting (AEPH) chips is disclosed. The method comprises allocating a plurality of unique AEPH identities by an AEPH management application executing on a computer system, wherein each unique identity comprises an identity of a product item and an instance identity; allocating a security key applicable to the plurality of unique AEPH identities by the AEPH management application; storing the security key and the plurality of unique AEPH identities by the AEPH management application in a first immutable record in a datastore, wherein the unique AEPH identities are associated with an initial state; and providing the security key and the plurality of unique AEPH identities by the AEPH management application to an original equipment manufacturer (OEM) of AEPH chips, whereby the OEM manufactures a plurality of AEPH chips, installs the security key in each of the AEPH chips, and installs a different one of the plurality of unique AEPH identities in each of the AEPH chips. The method further comprises providing an application programming interface (API) by the AEPH management application; receiving a request via the API by the AEPH management application from an affiliated device to update a state associated in the datastore with a first unique AEPH identity identified in the request, wherein the affiliated device presents the security key or a key derived from the security key to an AEPH chip having the first unique AEPH identity installed to enable the AEPH chip to broadcast the first unique AEPH identity; authorizing by the AEPH management application the request to update the state associated with the first unique AEPH identity in the datastore; and adding a second immutable record to the database by the AEPH management application that associates the first unique AEPH identity with an updated state of the first unique AEPH identity.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
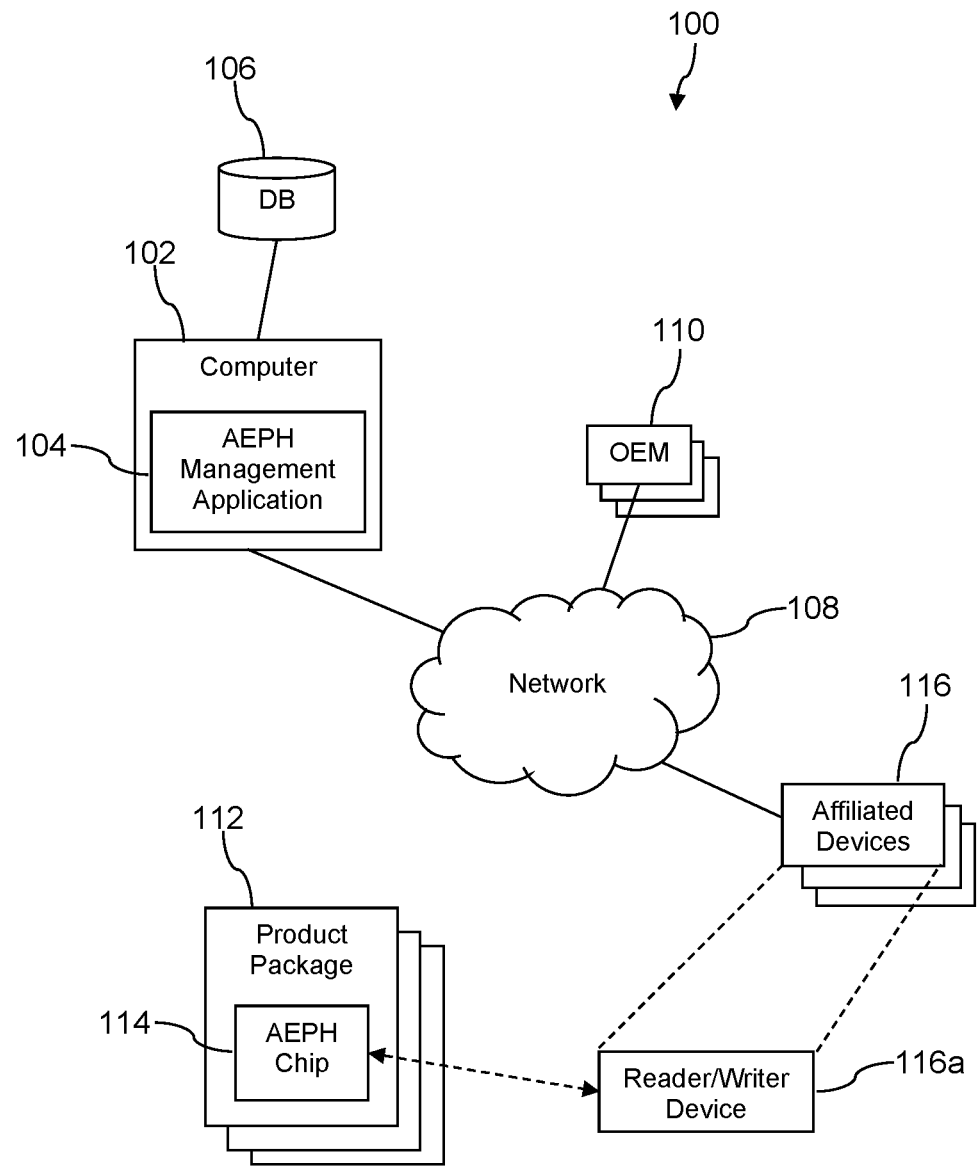
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches establishing, allocating, and managing unique identities for ambient electromagnetic power harvesting (AEPH) chips that may be attached to individual instances of products to identify these products and manage information about the lifecycle of the products and/or containers holding the products. For example, an AEPH chip having a unique identity may be affixed to a plastic bottle and thereby associate the unique identity to that plastic bottle and/or its contents and be used to track a state of the plastic bottle and/or its contents and/or track lifecycle events of the plastic bottle and/or its contents. In an embodiment, the unique identities comprise an identity of the product and an identity of a product instance. For example, the unique identity may comprise a stock keeping unit (SKU) or a universal product code (UPC) that identifies a product and a unique identity, such as a serial number, that identifies a specific instance of the product.

While typically identities stored in radio frequency identity (RFID) chips are established by the original equipment manufacturer (OEM) of the RFID chip who programs an identity into the RFID chip during manufacture, the present disclosure teaches an independent AEPH identity management service that establishes the unique identities. It is noted, additionally, that identities in RFID chips, typically, identify only a product and not a product instance, for example, identify a particular model of a mobile communication device but does not distinguish between different instances of the same model of mobile communication device. The present disclosure teaches a particular technical solution to the technical problem of reliably and demonstrably (e.g., providing attestation) controlling unique identities of AEPH chips.

Authorized OEMs may use an application programming interface of the AEPH identity management service to obtain the unique identities when programming these unique identities into the AEPH chips during manufacturing. The AEPH identity management service may store these identities with associated information in an immutable record in a datastore, for example in a block in a blockchain or in a hyperledger, whereby to support attestation by the AEPH identity management service of the information associated to the identities.

When the OEM completes manufacturing of AEPH chips embedding the allocated identities, the OEM uses the API of the AEPH identity management service to provide notification of initiation of the identities into AEPH chips. The AEPH identity management service stores these identities with event information (e.g., the event of being initiated into physical AEPH chips) in a new immutable record in the datastore, for example as a new block in a blockchain or in a hyperledger. In some contexts, the event information may be referred to as state information or simply state. One immutable record may store the event information in association with identities of a large number of the AEPH chips in a single immutable record. This event information may indicate the identity of the OEM, where the identity was initiated into the AEPH chips, as well as a date of initiation.

The OEM and other users of the AEPH identity management service may use the API to record other events related to the AEPH chips in additional immutable records in the datastore. For example, the OEM may request storing event information about shipping a plurality of AEPH chips to a product manufacturer, for example, a manufacturer of aluminum cans or plastic bottles. For example, a manufacturer of containers may request storing event information about affixing AEPH chips to a plurality of containers. For example, a warehouse business may request storing event information about receiving products having AEPH chips affixed to the product containers. For example, a retail business may request storing event information about receiving products having AEPH chips affixed to the product containers. For example, a recycling center may request storing event information about receiving and recycling product containers having AEPH chips affixed to the recycled product containers. In each of these cases, the requests may include a plurality of identities associated with the same event information. The AEPH identity management service may create associations of a plurality of the identities to the same event information in a new immutable record.

In one use, the AEPH chip is attached to a recyclable container such as a glass bottle. When the glass bottle is processed at a recycling center, the AEPH chip can be read, and credit for recycling can be distributed based on the information stored in an immutable record in the datastore that is looked up based on the unique identity initiated into this particular AEPH chip. For example, information about a purchase of the glass bottle by a consumer at a retail store may have been captured by a point-of-sale terminal (e.g., a customer who is participating in a customer loyalty incentive program) and stored in an immutable record in the datastore. Credit for the customer recycling the glass bottle can automatically be credited to the customer. This would provide considerable convenience both for consumers and for retailers. Consumers could just place their glass bottles in their recyclables bin for curbside pickup, and the rest would be handled by the system, including the credit to them for their recycling. The retailer would be relieved of the burden of receiving empty glass bottles, paying deposits for the empty glass bottles, storing them to accumulate a stock of glass bottles, and then returning them to the supplying company before they are reimbursed for the deposit they have already paid. For example, in some environments carbon taxes may be paid on bottles by bottle manufacturers. By securely tracking the lifecycle of a bottle having an AEPH chip attached to it (or tens of thousands of bottles) to a recycling center, a bottle manufacturer may be able to secure carbon tax rebates on the bottles that are recycled.

The AEPH identity management service can attest to the veracity of its identity tracking because it is solely responsible for allocation of the identities and tracks the identities associated to events related to the identities in immutable records. The AEPH identity management service can evaluate requests to capture information about events associated with AEPH identities based on a set of event rules. The event rules could specify a sequence of events that is allowable. For example, a second AEPH identity initiation event request that occurs after a first AEPH identity initiation event and after a first AEPH chip shipment event would be rejected as being contrary to defined rules. Likewise, an AEPH identity receipt at a retail store location event request that occurs after a retail store sale event request would be rejected as being contrary to defined rules. On the other hand, an event of an AEPH identity receipt at a warehouse event after an event of an AEPH identity receipt at a retail store location event may be allowed, for example to support the state change of returning a product from a retail store to a warehouse. In this way, the AEPH identity management service could police the use of the AEPH identities and assure that the users of the AEPH identity management service comply with usage rules. It may be that ordinary errors account for some of the rejections. But a pattern of rejections may indicate systematic violation of usage rules by a specific user. This specific user might then be audited and obliged to remedy their errors. Failure to remediate the problem might result in excluding the subject user from access to the API of the AEPH identity management service.

In an embodiment, the AEPH identity management service provides one or more secure keys with the unique identities that it provides to the OEM of the AEPH chips. The OEM then embeds the one or more secure keys into the AEPH chips. It is noted that the same secure key or the same set of secure keys may be embedded into a large number of the AEPH chips, even though each AEPH chip is provisioned with a unique identity. In this embodiment, an authorized user of the AEPH identity management service must provide a code related to the single secure key or one secure key from the set of secure keys to read the AEPH identity from the AEPH chips. In this embodiment, the AEPH chip does not automatically broadcast its unique AEPH identity when it is powered on by an ambient electromagnetic field, it first validates that it is receiving a valid secure key or valid code derived from the secure key before broadcasting its unique AEPH identity. The use of such a secure key or set of secure keys can promote the AEPH identity management service controlling access to the identities of the AEPH chips. The AEPH identity management service can distribute different codes derived from a single secure key stored in the AEPH chips to different authorized users of the AEPH identity management service. Alternatively, the AEPH identity management service can distribute different secure keys selected from the set of secure keys embedded in the AEPH chips to different authorized users of the AEPH identity management service.

Turning now to FIG. 1, a system 100 is described. In an embodiment, system 100 comprises a computer 102 that executes an AEPH management application.

Computers and computer systems are discussed further hereinafter. The computer 102 communicates with a datastore 106 that stores information about AEPH identities and event histories about the identities. While the computer 102 and the data store 106 are illustrated in FIG. 1 as communicating directly, in an embodiment, the computer 102 communicates with the data store 106 via a network 108. The network 108 comprises one or more private networks, one or more public networks, or a combination thereof.

The AEPH management application 104 establishes, allocates, and manages unique identities for AEPH chips. The unique identities, as discussed further below, may comprise a product identity component (e.g., a SKU or a UPC) and a unique identity (e.g., a product serial number). Alternatively, in another embodiment, the unique identities do not identify a product. In some contexts, the unique identities (with or without a product identity component) may be referred to as AEPH identities or unique AEPH identities. The AEPH management application 104 may send the unique identities associated with a plurality of AEPH chips to an original equipment manufacturer (OEM) 110 that manufactures the AEPH chips. The OEM 110 may then install one of the unique identities into each of the plurality of AEPH chips, for example during manufacturing of the AEPH chips. The unique identity of each AEPH chip may be embedded or provisioned into a static memory portion of the AEPH chip that cannot be changed after it is written to the first time by the OEM 110. In an embodiment, the AEPH chip may further comprise a dynamic memory portion that can be written to multiple times. It is understood that the use of the term "dynamic memory" in this context refers to the ability to write to this portion of memory multiple times. As used herein, this "dynamic memory" portion is non-transitory and retains its data content across periods of the AEPH chip being powered off. This process contrasts with the customary AEPH chip manufacturing process where the OEM 110 controls the assignment of identities to AEPH chips.

The system 100 further comprises one or more product packages 112 each having an AEPH chip 114 manufactured by the OEM 110 affixed to the product package 112. Authorized users of the AEPH management service provided by the AEPH management application 104 may have affiliated devices 116 that comprise a reader/writer device 116a. The reader/writer device 116a may read the unique identities of each of a plurality of AEPH chips 114 and invoke an application programming interface (API) of the AEPH management application 104 to obtain a service. For example, the affiliated device 116 may request that a lifecycle event associated with the product package 112 be recorded by the AEPH management application 104. In an embodiment, the reader/writer device 116a may communicate with AEPH chip 114 using a radio frequency allocated for cellular communication, for example a cellular radio frequency in the 2.4 GHz to 2.6 GHz frequency range. In an embodiment, the AEPH chip 114 may harvest electromagnetic energy from a cellular radio frequency band, for example from a cellular radio frequency in the 2.4 GHz to 2.6 GHz frequency range. In an embodiment, the AEPH chip 114 may harvest electromagnetic energy from a radio frequency band of 2.495 GHz to 2.5 GHz.

The life cycle event may be initializing the unique AEPH identity into the AEPH chip 114 by the OEM 110. The lifecycle event may be shipping the AEPH chips from the OEM 110 to a manufacturer of product packages 112. The lifecycle event may be shipping the product packages 112 to a food or product manufacturer. The lifecycle event may be filling the product packages 112 with food or product by a food or product manufacturer. The lifecycle event may be shipping the product packages 112 after they are filled with food or product to a warehouse. The lifecycle event may be shipping the product packages 112 filled with food or product from a warehouse to a retail store. The lifecycle event may be selling the product packages 112 filled with food or product to an end user. The lifecycle event may be receiving the product packages 112 emptied at a recycling center and recycling the product packages 112. While the use case of tracking product packages 112 and recording a lifecycle of the product packages 112 is described herein, it will be appreciated that the AEPH identity management service described herein can be applied to a wide variety of different use cases.

When invoking the API provided by the AEPH management application 104, the affiliated device 116 may provide a valid authentication token or successfully complete an authentication challenge session before the AEPH management application 104 performs the requested service. It the affiliated device 116 is authenticated, the AEPH management application 104 determines if the requested lifecycle event is valid, given a lifecycle history of a specific AEPH identity. For example, entering a lifecycle event for initializing the unique AEPH identity into the AEPH chip 114 may not be valid if the lifecycle history already includes the events of (A) initializing the unique AEPH identity into the AEPH chip 114, (B) shipping the AEPH chip from the OEM 110 to a manufacturer of product packages, and (C) shipping the product package 112 with the AEPH chip 114 affixed to a food or product manufacturer. Thus, the AEPH management application 104 may enforce a set of allowed statechange rules on requests to record lifecycle events for AEPH chips 114. Additionally, the AEPH management application 104 may restrict some affiliated devices 116 from requesting recordation of lifecycle events inappropriate for that specific affiliated device 116. For example, the AEPH management application 104 may reject a request to record a lifecycle event of filling the product package 112 with food or product by an affiliated device 116 associated with a retail store or associated with an OEM 110 of the AEPH chip 114.

In an embodiment, the AEPH management application 104 associates one or more secure keys to a large block of AEPH chips. While the AEPH identity for each AEPH chip 114 is different from the AEPH identities of other AEPH chips 114, the secure key or secure keys may be the same for a large number of the AEPH chips 114, for example one hundred thousand AEPH chips, one million AEPH chips, ten million AEPH chips, or some other number. The secure key or secure keys are installed by the OEM 110 in the AEPH chips 114 when they are built. In an embodiment where a single secure key is installed by the OEM 110 into the AEPH chips 114, affiliated devices 116 may be provisioned by the AEPH management application 104 with different codes derivable from the single secure key. When the AEPH chip 114 receives one of the derived codes, it can check this derived code against the single secure key to determine if the derived code is valid. In an embodiment where a set of secure keys is installed by the OEM 110 into the AEPH chips 114, each of the affiliated devices 116 may be provisioned with a different one of the keys in the set of secure keys. When the AEPH chip 114 receives one of the secure keys from the set of secure keys it can determine that it is a valid secure key and can then broadcast its unique AEPH identity. In an embodiment, the AEPH management application 104 may change the security keys that it associates to AEPH chips 114 occasionally, for example once per month, once per quarter, or on some other interval. In this way, if business arrangements between an operator of the AEPH identity management service provided by the AEPH management application and affiliated devices 116 changes (e.g., if a relationship is discontinued), the affiliated devices 116, once unaffiliated, will not be able to read unique identities of AEPH chips 114 initialized with the new security keys.

The affiliated devices 116 via the reader/writer device 116a may write data into the dynamic memory portion of the AEPH chips 114 described briefly earlier. The AEPH chip 114 may require the reader/writer device 116a to provide the security key to successfully complete a write operation or a read operation.

The AEPH identity management service provided by the AEPH management application 104 supports recording lifecycle events across a complete lifecycle of the product package 112, storing the lifecycle event history in an immutable record in the datastore 106, and supporting attestation of the lifecycle event history. For example, concerned parties that wish to monitor recycling of product packages 112 and/or reimbursement of previously paid carbon taxes may require that the AEPH identity management service be able to attest the accuracy and freedom from error of the records stored by the AEPH management application 104 in the data store 106. The AEPH identity management service is able to perform this attestation because the data store 106 is demonstrably immutable, for example because it is implemented as a blockchain or as a hyperledger.

Figure 2:
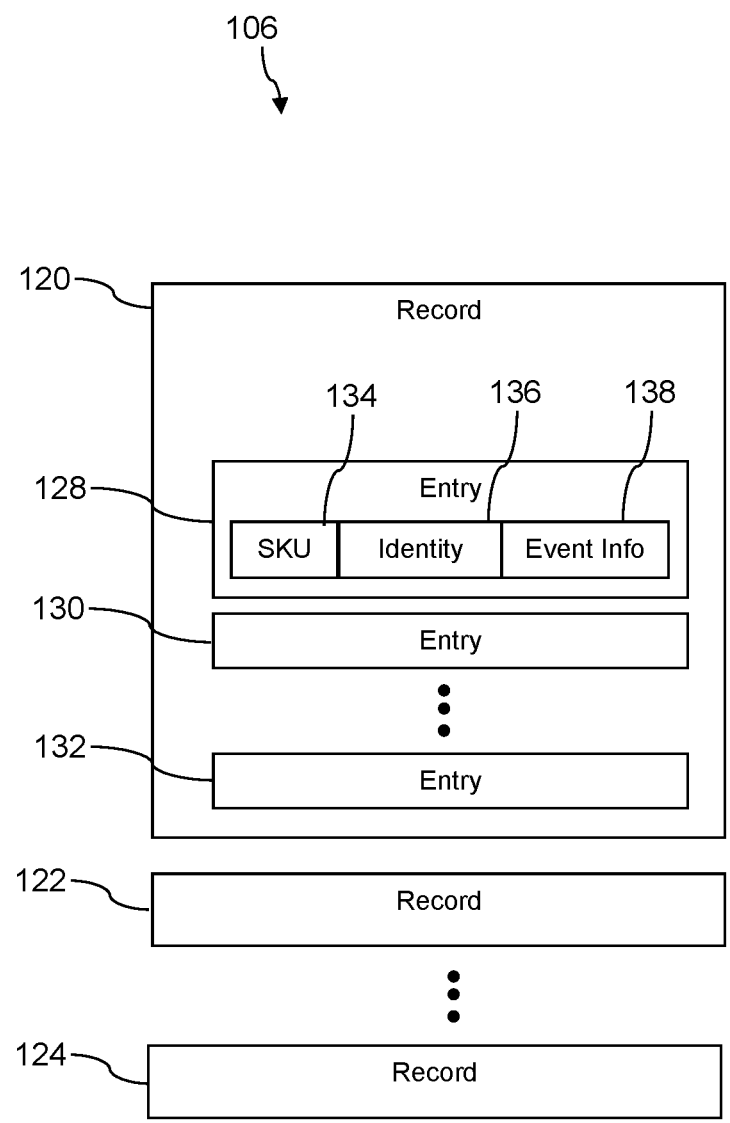
FIG. 2 is a block diagram of a data store according to an embodiment of the disclosure.

Turning now to FIG. 2, further details of the data store 106 are described. In an embodiment, the data store 106 comprises a plurality of records. The data store 106 may comprise any number of records. In an embodiment, the data store 106 comprises a first record 120, a second record 122, and a third record 124. Each record may comprise one or more entries, wherein each entry comprises event information indexed to a unique AEPH identity. For example, the first record 120 is illustrated as having a first entry 128, a second entry 130, and a third entry 132. The first entry 128 is illustrated as comprising a SKU 134, an identity 136, and event information 138. The combination of the SKU 134 with the identity 136 constitutes a unique AEPH identity. It is noted that in an embodiment, the unique AEPH identity does not contain a SKU 134 and only contains the identity 136. The event information 138 comprises an indication of a lifecycle event that has been recorded for the AEPH chip 114 identified by the identity 136 and the optional SKU 134.

Lifecycle events can be any of a wide variety of different events. Different sets of lifecycle events may be applicable to different objects to which the AEPH chips 114 are attached to. In an embodiment, the set of lifecycle events applicable to a particular category of objects, for example applicable to bottled products, may be restricted to a relatively small number of different events. For example, the lifecycle events may indicate the event of initializing the AEPH chip 114 with a unique AEPH identity and optionally initializing one or more secure keys into the AEPH chip 114. The lifecycle events may indicate the event of shipping to a first category of participants in a supply chain, the event of shipping from the first category of participants in the supply chain to a second category of participants in the supply chain, the event of shipping from the second category of participants to a third participant in the supply chain, the event of selling the bottled product to an end user, and the event of recycling the bottle. Other events may include filling the bottle with a product. In an embodiment, the event information 138 may include a date on which the event occurred and an identity of a party that provided the event information 138.

The number of entries included in a record 120, 122, 124 can vary from record to record. In an embodiment, an affiliated device 116 may accumulate events associated with different AEPH chips 114 for a period of time, collect the event information together, and send the collection of event information to the AEPH management application 104 in a single request. The AEPH management application 104 may create a single record 120, 122, 124 that includes all the event information provided in a single request by the affiliated device 116. Alternatively, the AEPH management application 104 may combine event information from a plurality of affiliated devices 116 and place entries 128, 130, 132 from different affiliated devices 116 into the same record 120, 122, 124. The records 120, 122, 124 may each be a data field of a block in a blockchain or in a hyperledger, where the blocks each comprise the data field, a hash of a previous block, a nonce value, and a hash over the block itself. The blockchain or hyperledger is stored in the data store 106.

It is understood that authorized users of the AEPH identity management service provided by the AEPH management application 104 may create and maintain their own data stores using the unique AEPH identity as an index into their proprietary data store. These proprietary data stores may include much additional information not contained in the data store 106. For example, the data base of a soft drinks company may have entries for unique AEPH identities that includes information on when the soft drink product was produced, a lot number of the product, a recipe version used to make the product, information on component ingredients used in making the product. But these data stores will not be the source of record for lifecycle history of the products to which the AEPH chips 114 are attached. The authoritative source for the lifecycle history of the products to which the AEPH chips 114 are attached will be the data store 106.

Figure 3A:
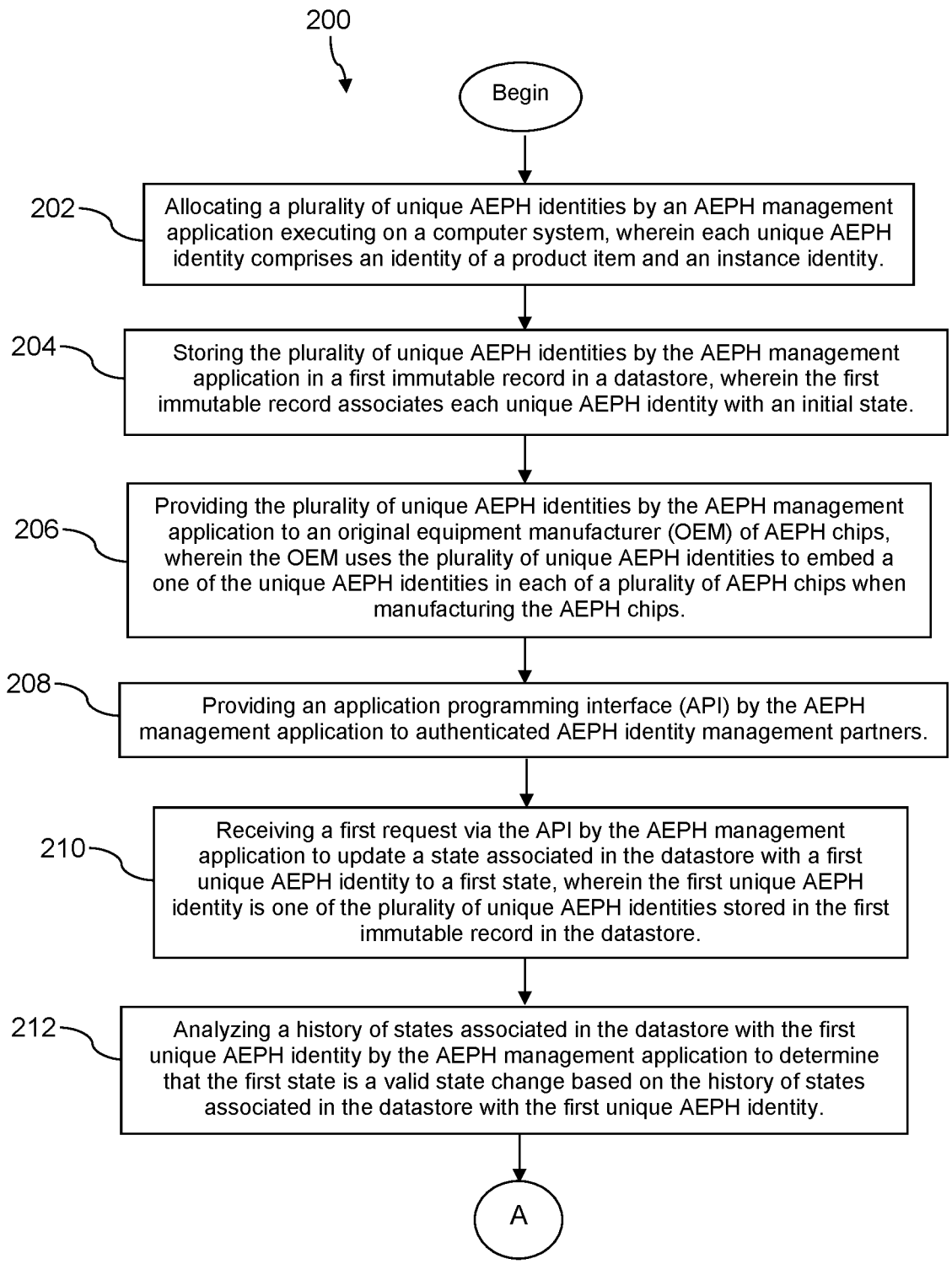
FIG. 3A and FIG. 3B is a flow chart of a method according to an embodiment of the disclosure.
Figure 3B:
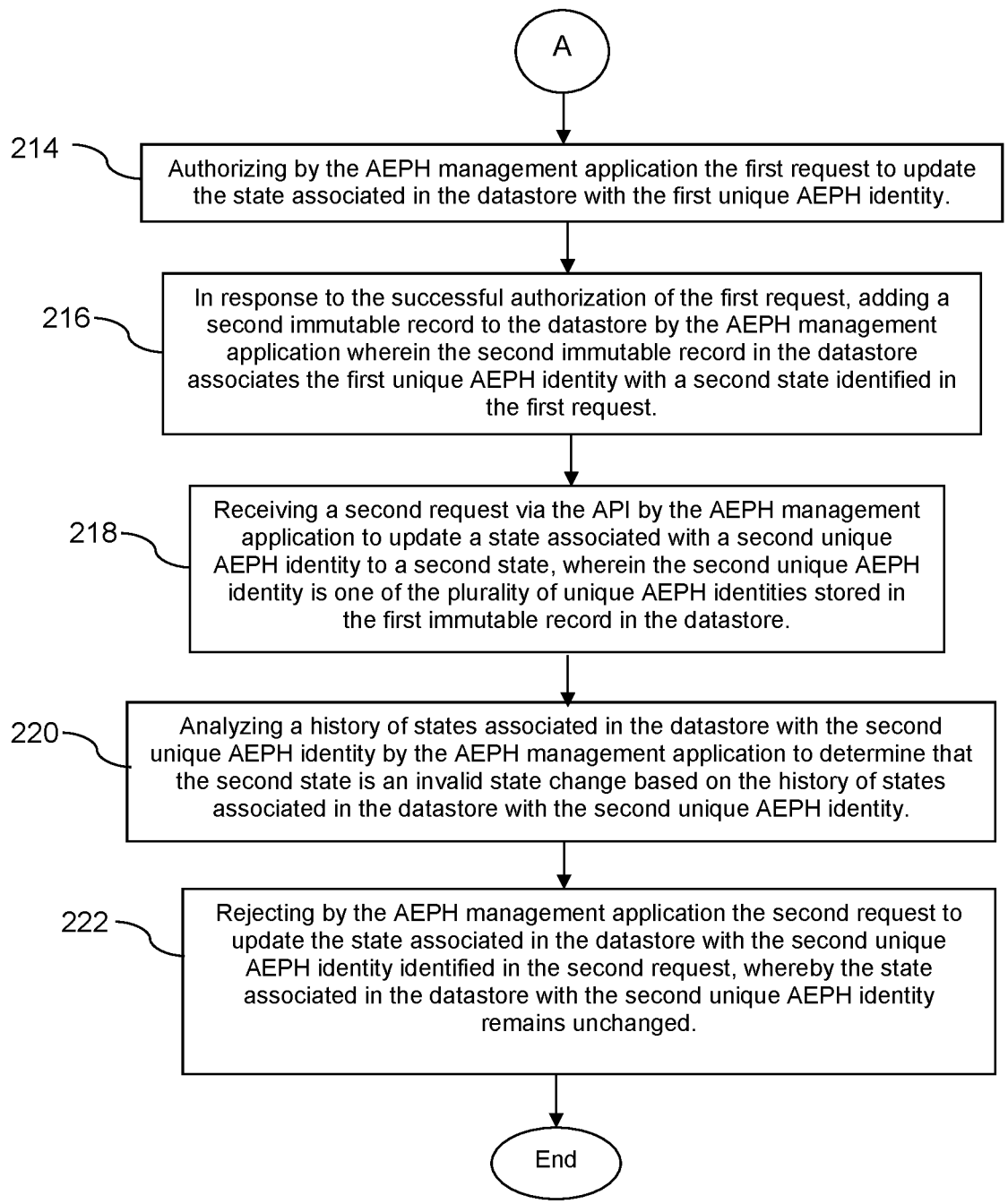

Turning now to FIG. 3A and FIG. 3B, a method 200 is described. In an embodiment, the method 200 is a method of controlling assignment and management of identities in ambient electromagnetic power harvesting (AEPH) chips. In an embodiment, the AEPH chips harvest electromagnetic power from a frequency band in the range of 2.4 GHz to 2.6 GHz. In an embodiment the AEPH chips harvest electromagnetic power from a frequency band in the range of 2.495 GHz to 2.5 GHz. At block 202, the method 200 comprises allocating a plurality of unique AEPH identities by an AEPH management application executing on a computer system, wherein each unique AEPH identity comprises an identity of a product item and an instance identity. In an embodiment, the identity of the product item is one of a stock keeping unit (SKU) identity or a universal product code (UPC) identity.

At block 204, the method 200 comprises storing the plurality of unique AEPH identities by the AEPH management application in a first immutable record in a datastore, wherein the first immutable record associates each unique AEPH identity with an initial state. In an embodiment, the first immutable record is stored in a blockchain in the datastore or in a hyper ledger in the datastore. At block 206, the method 200 comprises providing the plurality of unique AEPH identities by the AEPH management application to an original equipment manufacturer (OEM) of AEPH chips, wherein the OEM uses the plurality of unique AEPH identities to embed a one of the unique AEPH identities in each of a plurality of AEPH chips when manufacturing the AEPH chips.

At block 208, the method 200 comprises providing an application programming interface (API) by the AEPH management application to authenticated AEPH identity management partners. At block 210, the method 200 comprises receiving a first request via the API by the AEPH management application to update a state associated in the datastore with a first unique AEPH identity to a first state, wherein the first unique AEPH identity is one of the plurality of unique AEPH identities stored in the first immutable record in the datastore.

At block 212, the method 200 comprises analyzing a history of states associated in the datastore with the first unique AEPH identity by the AEPH management application to determine that the first state is a valid state change based on the history of states associated in the datastore with the first unique AEPH identity. At block 214, the method 200 comprises authorizing by the AEPH management application the first request to update the state associated in the datastore with the first unique AEPH identity.

At block 216, the method 200 comprises in response to the successful authorization of the first request, adding a second immutable record to the datastore by the AEPH management application wherein the second immutable record in the datastore associates the first unique AEPH identity with a second state identified in the first request. In an embodiment, the second immutable records are stored in a blockchain in the datastore or in a hyperledger in the datastore. At block 218, the method 200 comprises receiving a second request via the API by the AEPH management application to update a state associated with a second unique AEPH identity to a second state, wherein the second unique AEPH identity is one of the pluralities of unique AEPH identities stored in the first immutable record in the datastore.

At block 220, the method 200 comprises analyzing a history of states associated in the datastore with the second unique AEPH identity by the AEPH management application to determine that the second state is an invalid state change based on the history of states associated in the datastore with the second unique AEPH identity. At block 222, the method 200 comprises rejecting by the AEPH management application the second request to update the state associated in the datastore with the second unique AEPH identity identified in the second request, whereby the state associated in the datastore with the second unique AEPH identity remains unchanged.

In an embodiment, the method 200 further comprises receiving authentication credentials from AEPH identity management partners and validating the authentication credentials, whereby the AEPH identity management partner authenticates the AEPH identity management partners. In an embodiment, the method 200 further comprises receiving a request by the AEPH management application to complete an attestation process on integrity of the plurality of unique AEPH identities; reading all of the immutable records in the datastore; analyzing the immutable records read from the datastore; and providing an attestation report based on analyzing the immutable records.

Figure 4A:
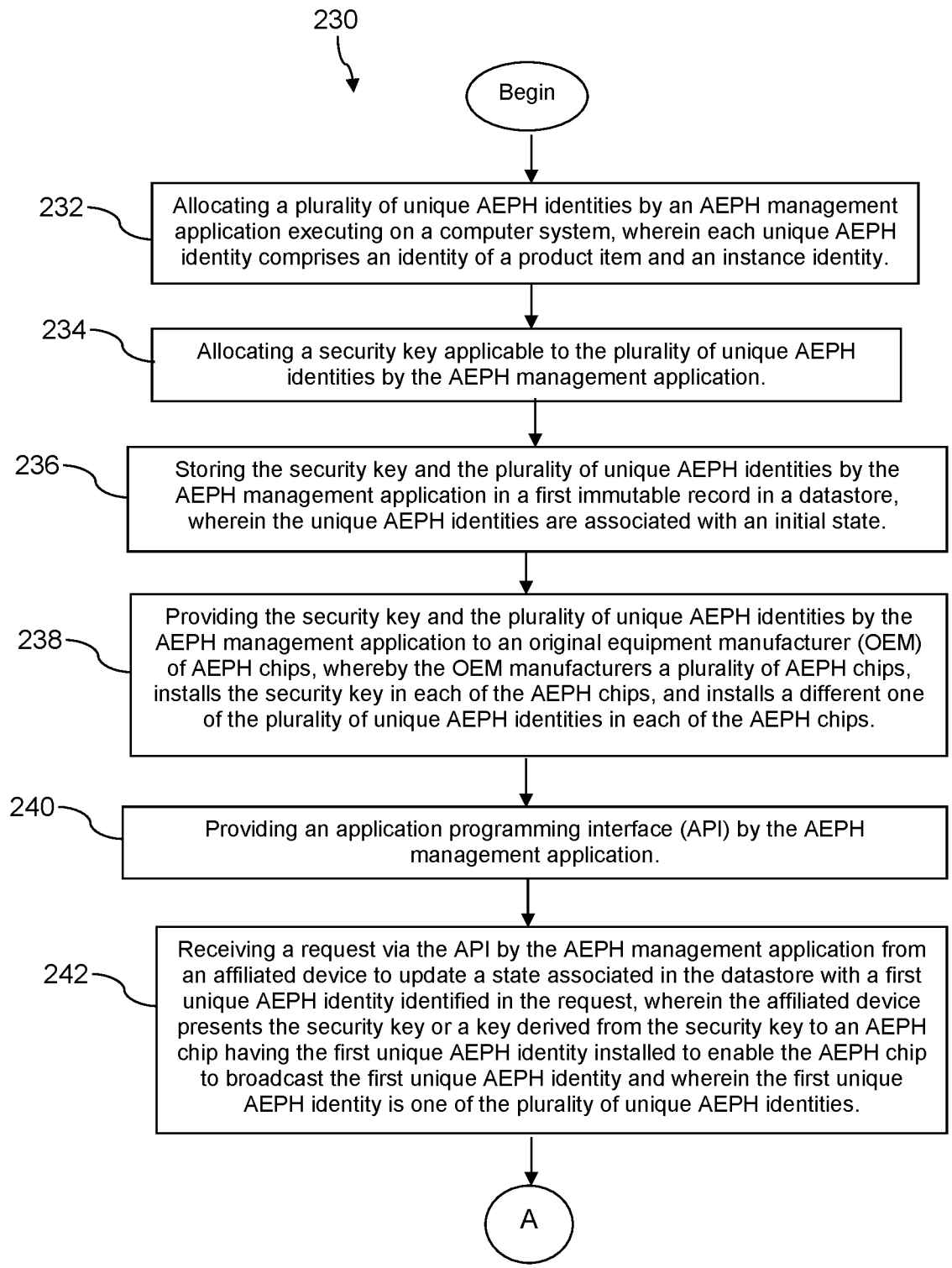
FIG. 4A and FIG. 4B is a flow chart of another method according to an embodiment of the disclosure.
Figure 4B:
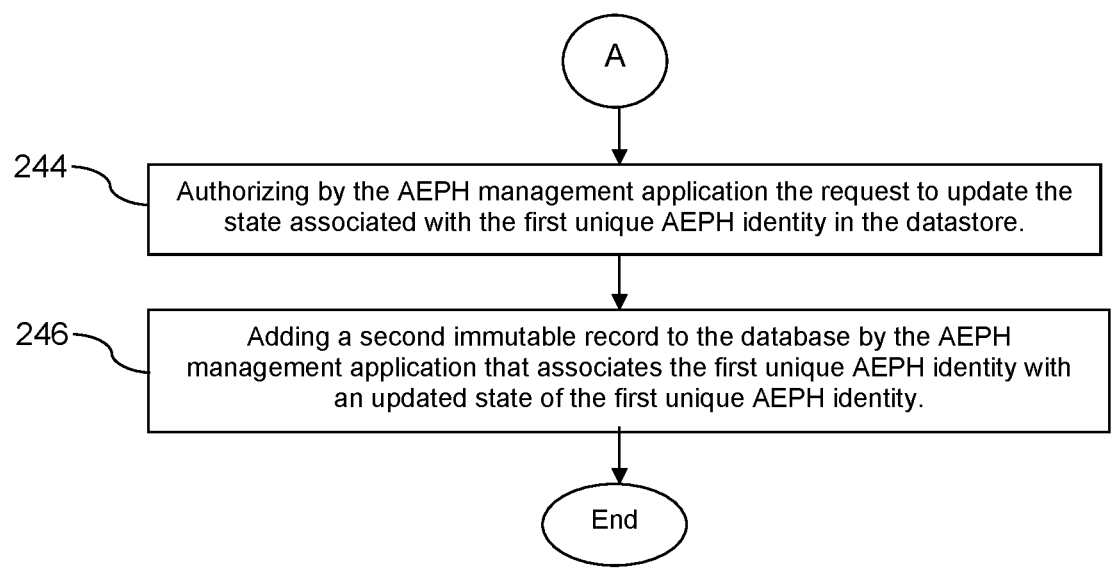

Turning now to FIG. 4A and FIG. 4B, a method 230 is described. In an embodiment, the method 230 is a method of controlling assignment and management of identities in ambient electromagnetic power harvesting (AEPH) chips. In an embodiment, the AEPH chips harvest electromagnetic power from a frequency band in the range of 2.4 GHz to 2.6 GHz. In an embodiment, the AEPH chips harvest electromagnetic power from a frequency band in the range of 2.495 GHz to 2.5 GHz.

At block 232, the method 230 comprises allocating a plurality of unique AEPH identities by an AEPH management application executing on a computer system, wherein each unique identity comprises an identity of a product item and an instance identity.

At block 234, the method 230 comprises allocating a security key applicable to the plurality of unique AEPH identities by the AEPH management application. At block 236, the method 230 comprises storing the security key and the plurality of unique AEPH identities by the AEPH management application in a first immutable record in a datastore, wherein the unique AEPH identities are associated with an initial state.

At block 238, the method 230 comprises providing the security key and the plurality of unique AEPH identities by the AEPH management application to an original equipment manufacturer (OEM) of AEPH chips, whereby the OEM manufactures a plurality of AEPH chips, installs the security key in each of the AEPH chips, and installs a different one of the pluralities of unique AEPH identities in each of the AEPH chips. At block 240, the method 230 comprises providing an application programming interface (API) by the AEPH management application.

At block 242, the method 230 comprises receiving a request via the API by the AEPH management application from an affiliated device to update a state associated in the datastore with a first unique AEPH identity identified in the request, wherein the affiliated device presents the security key or a key derived from the security key to an AEPH chip having the first unique AEPH identity installed to enable the AEPH chip to broadcast the first unique AEPH identity and wherein the first unique AEPH identity is one of the plurality of unique AEPH identities. At block 244, the method 230 comprises authorizing by the AEPH management application the request to update the state associated with the first unique AEPH identity in the datastore. At block 246, the method 230 comprises adding a second immutable record to the database by the AEPH management application that associates the first unique AEPH identity with an updated state of the first unique AEPH identity.

In an embodiment, the method 230 further comprises the affiliated device transmitting the security key to an AEPH chip; the AEPH chip determining that the security key is valid; the AEPH chip transmitting the first unique AEPH identity; and the affiliated device receiving the first unique AEPH identity. In an embodiment, the first and second immutable records are stored in a blockchain in the datastore. In an embodiment, the first and second immutable records are stored in a blockchain in the datastore.

Figure 5:
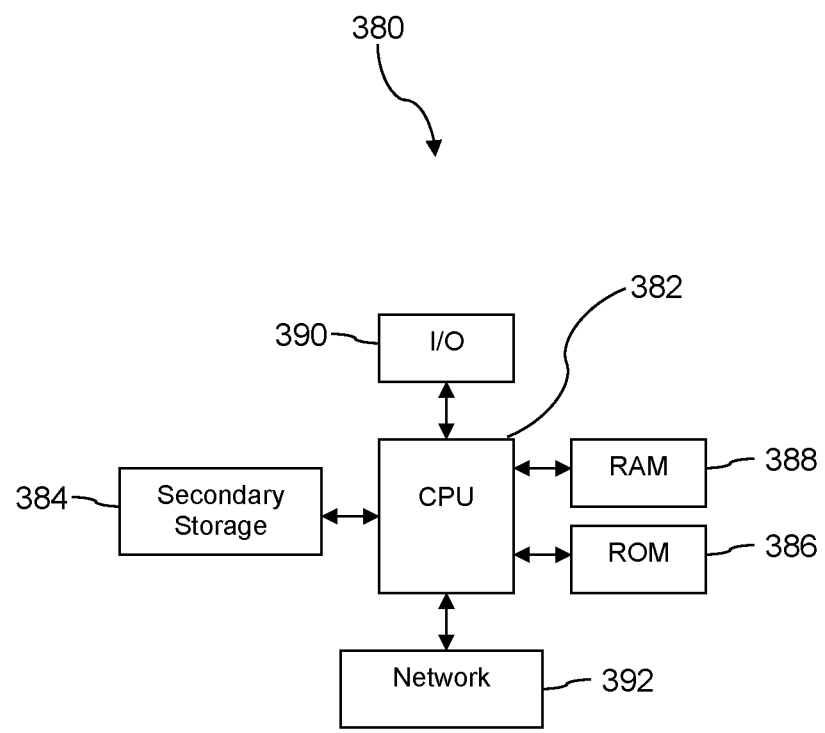
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of controlling assignment and management of identities in ambient electromagnetic power harvesting (AEPH) chips, comprising:
   allocating a plurality of unique AEPH identities by an AEPH management application executing on a computer system, wherein each unique AEPH identity comprises an identity of a product item and an instance identity;
   storing the plurality of unique AEPH identities by the AEPH management application in a first immutable record in a datastore, wherein the first immutable record associates each unique AEPH identity with an initial state;
   providing the plurality of unique AEPH identities by the AEPH management application to an original equipment manufacturer (OEM) of AEPH chips, wherein the OEM uses the plurality of unique AEPH identities to embed one of the unique AEPH identities in each of a plurality of AEPH chips when manufacturing the AEPH chips;
   providing an application programming interface (API) by the AEPH management application to authenticated AEPH identity management partners;
   receiving a request via the API by the AEPH management application to update a state associated in the datastore with a unique AEPH identity to a first state, wherein the unique AEPH identity is one of the plurality of unique AEPH identities stored in the first immutable record in the datastore;
   analyzing a history of states associated in the datastore with the unique AEPH identity by the AEPH management application to determine that the first state is a valid state change based on the history of states associated in the datastore with the unique AEPH identity;
   authorizing by the AEPH management application the request to update the state associated in the datastore with the unique AEPH identity;
   in response to the successful authorization of the request, adding a second immutable record to the datastore by the AEPH management application, wherein the second immutable record in the datastore associates the unique AEPH identity with a second state identified in the request;
   receiving a request by the AEPH management application to complete an attestation process on integrity of the unique AEPH identity;
   reading any immutable records in the datastore associated with the unique AEPH identity;
   analyzing the immutable records read from the datastore; and
   providing an attestation report based on analyzing the immutable records.

2. The method of claim 1, wherein the identity of the product item is one of a stock keeping unit (SKU) identity or a universal product code (UPC) identity.

3. The method of claim 1, wherein the AEPH chips harvest electromagnetic power from a frequency band in the range of 2.4 GHz to 2.6 GHz.

4. The method of claim 1, wherein the datastore stores the first immutable record and the second immutable record in a blockchain.

5. The method of claim 1, wherein the datastore stores the first immutable record and the second immutable record in a hyperledger.

6. The method of claim 1, further comprising receiving authentication credentials from AEPH identity management partners and validating the authentication credentials, whereby the AEPH identity management partner authenticates the AEPH identity management partners.

7. A system for controlling assignment and management of identities in ambient electromagnetic power harvesting (AEPH) chips, comprising:
   a processor;
   a non-transitory memory; and
   an AEPH management application stored in the non-transitory memory that, when executed by the processor:

allocates a unique AEPH identity, wherein the unique AEPH identity comprises an identity of a product item and an instance identity;

stores the unique AEPH identity in a first immutable record in a datastore, wherein the unique AEPH identity is associated with an initial state;

provides the unique AEPH identity to an original equipment manufacturer (OEM) of AEPH chips;

provides an application programming interface (API);

receiving a request via the API to update a state associated in the datastore with a unique AEPH identity;

authorizing the request to update the state associated with the unique AEPH identity in the datastore;

adds a second immutable record to the database that associates the unique AEPH identity with an updated state of the unique AEPH identity;

receives a request to complete an attestation process on integrity of the unique AEPH identity;

reads any immutable records in the datastore associated with the unique AEPH identity;

analyzes the immutable records read from the datastore; and provides an attestation report based on analyzing the immutable records.

8. The system of claim 7, wherein the request to update the state associated with the AEPH identity in the datastore comprises the state value.

9. The system of claim 8, wherein authorizing the request to update the state associated with the unique AEPH identity comprises comparing the state value in the request to a current state value associated with the unique AEPH identity in the datastore and determining that the change from the current state value to the state value in the request is valid.

10. The system of claim 7, wherein the AEPH chips are associated with plastic bottles, and wherein a different AEPH chip having a unique AEPH identity is affixed to each different plastic bottle, whereby each different plastic bottle is uniquely identifiable.

11. The system of claim 7, wherein the datastore stores the first and second immutable records in a blockchain.

12. The system of claim 7, wherein the datastore stores the first and second immutable records in a hyperledger.

13. The system of claim 7, wherein the AEPH chips harvest electromagnetic power from a frequency band in the range of 2.4 GHz to 2.6 GHz.

14. A method of controlling assignment and management of identities in ambient electromagnetic power harvesting (AEPH) chips, comprising:

allocating a plurality of unique AEPH identities by an AEPH management application executing on a computer system, wherein each unique identity comprises an identity of a product item;

storing the plurality of unique AEPH identities by the AEPH management application in a first immutable record in a datastore, wherein the unique AEPH identities are associated with an initial state;

providing the plurality of unique AEPH identities by the AEPH management application to an original equipment manufacturer (OEM) of AEPH chips;

providing an application programming interface (API) by the AEPH management application;

receiving a request via the API by the AEPH management application to update a state associated in the datastore with a unique AEPH identity identified in the request;

authorizing by the AEPH management application the request to update the state associated with the unique AEPH identity in the datastore;

adding a second immutable record to the database that associates the first unique AEPH identity with an updated state of the first unique AEPH identity;

receiving a request by the AEPH management application to complete an attestation process on integrity of one or more of the plurality of AEPH identities;

reading any immutable records in the datastore associated with the one or more of the plurality of unique AEPH identities;

analyzing the immutable records read from the datastore; and providing an attestation report based on analyzing the immutable records.

15. The method of claim 14, wherein each of the plurality of unique AEPH identities comprises a product identity and a unique identity, and wherein the unique identity of each of the unique AEPH identities is different and the product identity of at least some of the plurality of unique AEPH identities is the same.

16. The method of claim 14, wherein the request to update the state associated with the AEPH identity in the datastore comprises the state value.

17. The method of claim 16, wherein authorizing the request to update the state associated with the unique AEPH identity comprises comparing the state value in the request to a current state value associated with the unique AEPH identity in the datastore and determining that the change from the current state value to the state value in the request is valid.

18. The method of claim 14, wherein the AEPH chips are associated with plastic bottles, and wherein a different AEPH chip having a unique AEPH identity is affixed to each different plastic bottle, whereby each different plastic bottle is uniquely identifiable.

19. The method of claim 14, wherein the datastore stores the first and second immutable records in a blockchain.

20. The method of claim 14, wherein the datastore stores the first and second immutable records in a hyperledger.

* * * * *